J. DUNN.
SHOCK ABSORBER.
APPLICATION FILED MAY 28, 1913.
1,083,734.
Patented Jan. 6, 1914.
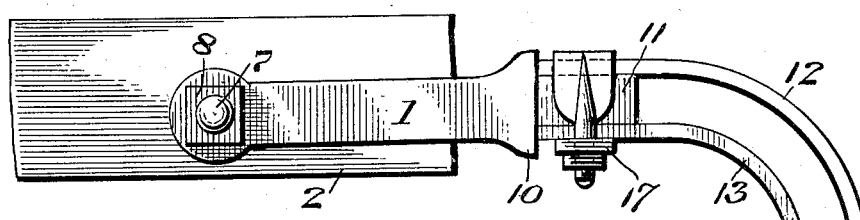
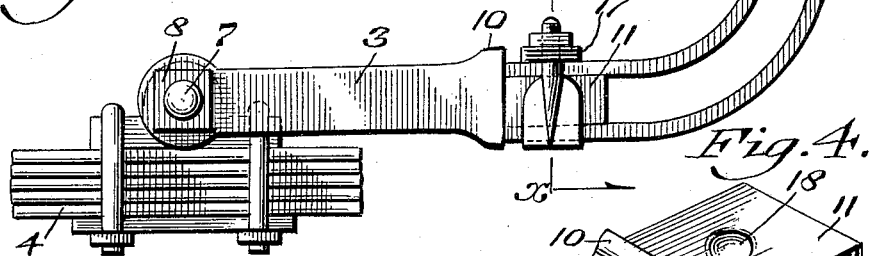
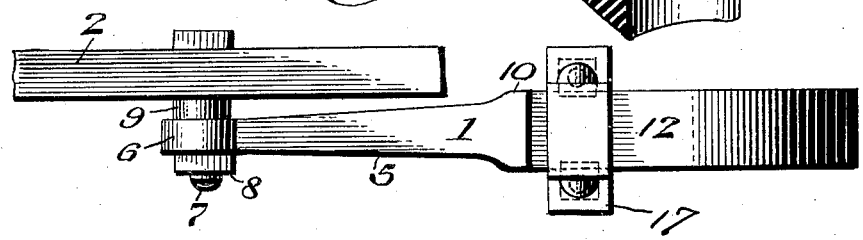
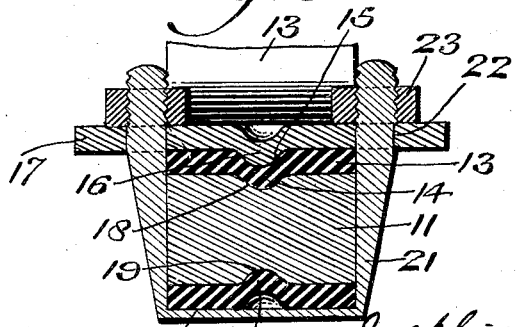
WITNESSES
P. F. Nagle.
H. G. Dieterich
INVENTOR
Joseph Dunn.
BY Wiedersheim Fairbanks
ATTORNEYS

UNITED STATES PATENT OFFICE.

JOSEPH DUNN, OF PHILADELPHIA, PENNSYLVANIA, ASSIGNOR OF ONE-HALF TO LEON COURTIN, OF PHILADELPHIA, PENNSYLVANIA.

SHOCK-ABSORBER.

1,083,734.  Specification of Letters Patent.  Patented Jan. 6, 1914.

Application filed May 28, 1913. Serial No. 770,367.

*To all whom it may concern:*

Be it known that I, JOSEPH DUNN, a citizen of the United States, residing in the city and county of Philadelphia, State of Pennsylvania, have invented a new and useful Shock-Absorber, of which the following is a specification.

My present invention relates to a novel shock absorber which is especially adapted to be employed in conjunction with motor or other vehicles whereby excessive shocks and vibrations are equalized and absorbed with consequent increase in the durability and life of the various parts of the vehicle.

It further consists of a novel shock absorber designed to prevent sudden action of the springs and arrest rebound, the parts being constructed and arranged in such a manner that the yielding portion of my device has the natural action of a spring in taking the shock.

It further consists of a novel shock absorber comprising two arms having removably connected therewith a plurality of spring members of novel construction.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a shock absorber embodying my invention. Fig. 2 represents a plan view of my device. Fig. 3 represents a section on line *x—x* Fig. 1. Fig. 4 represents a perspective view of a portion of an arm in detached position.

Similar numerals of reference indicate corresponding parts in the figures.

Referring to the drawings:—It will be understood that my novel shock absorber may be employed to advantage in all cases wherein the shock or vibration between two bodies is to be equalized or absorbed, although for purposes of illustration the same is shown as having the upper arm 1 secured to a framework 2 such as for example the body of the vehicle, while the lower arm 3 is secured with respect to a spring member 4 in any desired manner. Since the upper arm 1 and the lower arm 3 are constructed in a similar manner, I have deemed it unnecessary to describe in detail but one of such arms, it being seen that such arms converge toward the end, as indicated at 5, and are provided with apertured enlargements 6 through which the fastening bolts 7 pass, said bolts being provided with nuts 8 having spacing washers 9. Each arm near its end is provided with a boss 10 preferably rectangular from which extends a polygonal-shaped end portion 11, shown in the present instance as having a rectangular contour.

12 designates an outer spring member and 13 designates an inner spring member said members engaging opposite sides of the extension 11. The inner spring member 13 has a portion thereof near each end deflected to form a lug or projection 14 on one side and a depression or recess 15 on the opposite side. The depression 15 is adapted to receive a lug 16 carried by a cross-bar 17, the function of which is to cause the lug 14 to be interlocked with a recess 18 in the extension 11, it being best understood by reference to Fig. 3 that the opposite side of the extension 11 is provided with a recess 19. At each end of the outer spring 12, the material thereof is inwardly deflected to form a lug 20 which interlocks with the depression or recess 19.

21 designates a U-shaped clip which surrounds the outer spring 12, the extension 11, the inner spring 13 and passes through apertures 22 in the cross bar 17. The free ends of the clips 21 are threaded in order to adapt them to receive the nuts 23, whereby the parts are maintained in their assembled position.

It will thus be seen that when the parts are in their assembled condition, I provide a mechanism wherein a plurality of springs are employed which are spaced from each other, the ends of said springs peripherally abutting against the shoulders 10 of the upper and lower arms and said springs being adapted to interlock with and be secured to the extensions 11 of such arms, so that any relative movement of the ends of the springs with respect to the extension 11 is positively prevented. By such construction, I am enabled to devise a novel shock absorber which has a minimum weight and can be constructed at a comparatively small expense without affecting the resilient action of the shock absorber.

My novel shock absorber coöperates with the springs of the vehicle to eliminate the excessive shocks to which they would be otherwise subjected and any desired number of spring elements may be employed in the shock absorber, although for purposes of illustration, I have preferred to show but two of such elements which are spaced from each other and which are substantially U-shaped.

It will now be apparent that I have devised a novel and useful construction of a shock absorber which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a shock absorber, the combination with the vehicle body and a spring member, of U-shaped springs located one within the other and spaced substantially parallel with each other throughout their length, an end member having one end secured to said body and the other end secured to an end of each U-shaped spring, and a second end member having one end secured to said first mentioned spring and its opposite end secured to the opposite end of each U-shaped spring.

2. In a shock absorber, an upper and a lower arm, U-shaped springs having their ends seated on opposite sides of said upper and said lower arms, and means to secure the parts in assembled condition.

3. In a shock absorber, an upper and a lower arm, each having a polygonal shaped extension, a plurality of U-shaped springs spaced from each other and having means at their ends to interlock with said extensions, and means to secure said springs to said extensions.

4. In a shock absorber, an upper and a lower arm, each having a recess on opposite sides thereof, springs having means at their ends to interlock with said recesses, clips surrounding said arms and springs, and means to secure said springs and arms in assembled condition.

5. In a shock absorber, an upper and a lower arm, each having on opposite sides thereof a recess, an inner and outer U-shaped spring having portions deflected to engage said recesses, cross members interlocking with said inner spring, and fastening devices coöperating with said cross members to secure the parts in assembled condition.

6. In a shock absorber, an upper and a lower arm, each having one end apertured and the other provided with a plurality of locking means, U-shaped springs spaced from each other by said arms and interlocking with said locking means, cross bars positioned by one of said springs, clips surrounding said springs and arms and engaging said cross bars, and fastening devices for said clips.

JOSEPH DUNN.

Witnesses:
Theo. H. McCalla,
Wm. J. Quarin.

---

Copies of this patent may be obtained for five cents each, by addressing the "Commissioner of Patents, Washington, D. C."